US007530021B2

(12) United States Patent
Cheng et al.

(10) Patent No.: US 7,530,021 B2
(45) Date of Patent: May 5, 2009

(54) INSTANT MEETING PREPARATION ARCHITECTURE

(75) Inventors: Lili Cheng, Bellevue, WA (US); Shelly D. Farnham, Seattle, WA (US); William L. Portnoy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 622 days.

(21) Appl. No.: 10/816,977

(22) Filed: Apr. 1, 2004

(65) Prior Publication Data

US 2005/0222890 A1 Oct. 6, 2005

(51) Int. Cl.
*G06F 3/00* (2006.01)

(52) U.S. Cl. ........................... 715/753; 709/206; 705/9

(58) Field of Classification Search ................ 715/716, 715/753; 705/5, 9; 345/100; 709/206
See application file for complete search history.

(56) References Cited

U.S. PATENT DOCUMENTS 4,831,552 A * 5/1989 Scully et al. ................ 715/751
5,566,289 A 10/1996 Ikeo et al.
5,586,252 A 12/1996 Barnard et al.
5,608,857 A 3/1997 Ikeo et al.
5,664,063 A 9/1997 Johnson et al.
5,855,006 A * 12/1998 Huemoeller et al. ........... 705/9
6,247,043 B1 6/2001 Bates et al.
6,434,571 B1 8/2002 Nolte
7,012,627 B1 * 3/2006 Estrada et al. .............. 715/732
2002/0065701 A1 * 5/2002 Kim et al. ...................... 705/9
2003/0001880 A1 * 1/2003 Holtz et al. ................. 345/716
2003/0046296 A1 * 3/2003 Doss et al. .................. 707/102
2003/0191806 A1 * 10/2003 Osterberg et al. ........... 709/206
2003/0227479 A1 * 12/2003 Mizrahi et al. .............. 345/753
2005/0288939 A1 * 12/2005 Peled et al. .................... 705/1

OTHER PUBLICATIONS

R. Rodenstein, G. Abowd, and R. Catrambone. OwnTime: A System for Timespace management. Proceedings of CHI '99, ACM Press, 1999. 2 pages.
C.A. Knoblock, S. Minton, J.L. Ambite, M. Muslea, J. Oh, and M. Frank. Mixed-initiative, multi-source Information Assistants. Proceedings of the 10th International Conference on World Wide Web, pp. 697-707, 2001.

(Continued)

*Primary Examiner*—Stephen S Hong
*Assistant Examiner*—Phenuel S Salomon
(74) *Attorney, Agent, or Firm*—Amin, Turocy & Calvin, LLP

(57) ABSTRACT

Architecture that facilitates generation of an event report that is an aggregation of public and private data related to a specific task. Information about the event is automatically compiled, including the recipients, URLs, shares, attachments, and documents, as well as location maps and social relationships. The report can be a one-page document that summarizes topics of a meeting or event, the attendees, how the attendees relate, their motivations, and what the attendees may be looking for from the meeting. The report can be formatted to structure event information in a certain way such as according to a company organizational chart, such that an attendee that is higher up on the org chart will be presented on the report higher than someone who is lower on the org chart. Moreover, attendees can be grouped according to functions, or social groupings or project groups, for example.

33 Claims, 9 Drawing Sheets

OTHER PUBLICATIONS

V. Bellotti, N. Ducheneaut, M. Howard, I. Smith, and C. Neuwirth. Innovation in Extremis: Evolving and Application for the Critical Work of Email and Information Management. Proceedings of the Conference on Designing Interactive Systems, pp. 181-192, 2002.

Microsoft Windows 2000 Active Directory. http://www.microsoft.com/windows2000/technologies/directory/ad/default.asp. Last Viewed Jun. 29, 2004.

Microsoft Outlook. http://office.microsoft.com/home/office.aspx?assetid=FX01085793. Last Viewed Jun. 29, 2004.

* cited by examiner

INSTANT MEETING PREPARATION ARCHITECTURE

TECHNICAL FIELD

This invention is related to software scheduling, and more specifically to software that accesses multiple data types for consolidation onto a single document.

BACKGROUND OF THE INVENTION

In corporations where employees are spread out over large areas and perhaps on a campus of several buildings, meeting scheduling can be an important aspect of corporate profitability to ensure the timeliness of projects and other corporate missions. Scheduling meetings electronically includes inviting recipients and reserving a conference room, among other things. Where meetings are a daily occurrence for many employees, it is commonplace for a meeting agenda to not be distributed properly or not at all, the attendee list to change, topics to change and a whole list of other changes that can occur. Thus, it would be beneficial to have in place a mechanism whereby an attendee could easily pull together a concise report about the meeting and attendees from any location and at any time without having to rely on an outdated distribution.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that facilitates generation of a meeting preparation report that is an aggregation of public and private data for a specific task. It is a user view of the power of social network analysis. The invention compiles information about the meeting, including information about the recipients based on social relationships that is helpful in preparing for the meeting. URLs, shares, attachments, and documents can be referenced, as well as additional information on the meeting such as location maps, and on the recipients, including social relationships, are automatically provided.

The report can be a one-page document that summarizes topics of a meeting or event, the attendees, how the attendees relate, their motivations, and what the attendees may be looking for from the meeting. The report can be formatted to structure event information in a certain way. In one implementation, the event information on the report is structured according to a company organizational ("org") chart, such that an attendee that is higher up on the org chart will be presented on the report higher than someone who is lower on the org chart. Moreover, attendees can be grouped according to functions, or social groupings or project groups, for example.

In another aspect of the present invention, the information consolidated into the report document is retrieved from a plurality of disparate data sources, which sources can be local and/or distributed, public and/or private.

In yet another aspect thereof, a classifier is employed that automates features of the invention based in inferences made on data and processes of the invention.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
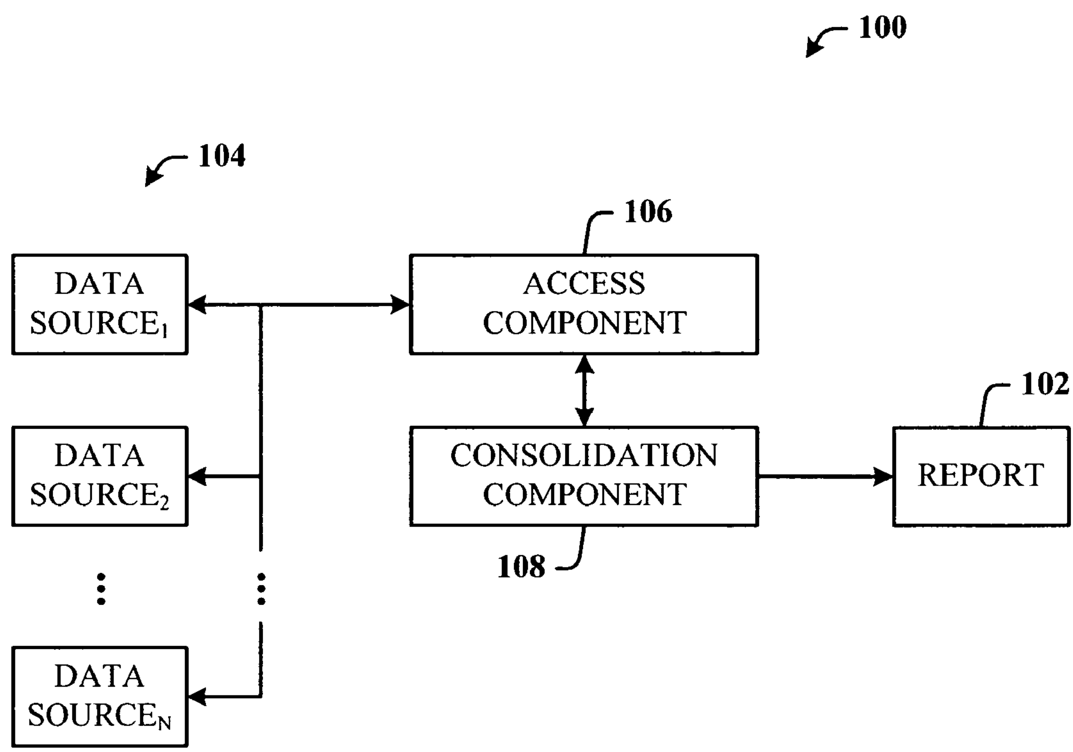
FIG. 1 illustrates a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a system 100 of the present invention. The system 100 facilitates the consolidation of event information related to an event into a report 102 that summarizes the basic event information for an attendee. This event can be a meeting having related thereto event information that includes, for example, a list of attendees, attendee profile information, meeting topics, meeting location, and a number of other event-related and/or attendee-related pieces of information. The report 102 can be quickly generated by accessing a number of different data sources 104 (denoted DATA $SOURCE_1$, DATA $SOURCE_2$, . . . , DATA $SOURCE_N$) to gather the event information data that is associated with the event. The event information can include at least images, text, and linked data, for example. The data sources 104 can include e-mail servers, databases, public and private data sources, web sites, directory services, and essentially any data source that is accessible for providing such event information.

In support thereof, the system 100 includes an access component 106 that facilitates accessing each of the data sources 104, and searching the data sources 104 for the relevant event information. Thus, the access component 106 can include a number of different search engines that are compatible with the various data sources 104 that will be searched. Once the event information has been accessed, or even as the event information is being searched and found, a consolidation component 108 analyzes, compiles, consolidates, and formats the event information into the report 102. The analysis function is that which is associated with social network analysis. Social networking is an ongoing process of establishing and utilizing connections through friends, family, and acquaintances, which in this context, is a company or company organization. Through these connections, trustworthy relationships are developed that generate information, referrals, advice, support, energy, and much more. However, the true value of social networking is found when moving beyond an individual's immediate contacts, where relationship assets become more important.

The format of the report 102 can be structured according to predetermined criteria. For example, in one implementation, the event information is structured according to a company organization chart. Thus, the attendee profile information is structured from the top down according to the corresponding top-down organization of the company. Any attendee can then immediately see the management who will be attending or who is scheduled to attend, and know exactly the composition of the audience to whom they may be required to present information. In another implementation, the order of event information is presented according to other criteria, for example, according to who will be presenting at the meeting. It is within the contemplation of the present invention that the format of the report 102 can be arranged in any manner suitable for the event, as desired by the particular users.

Figure 2:
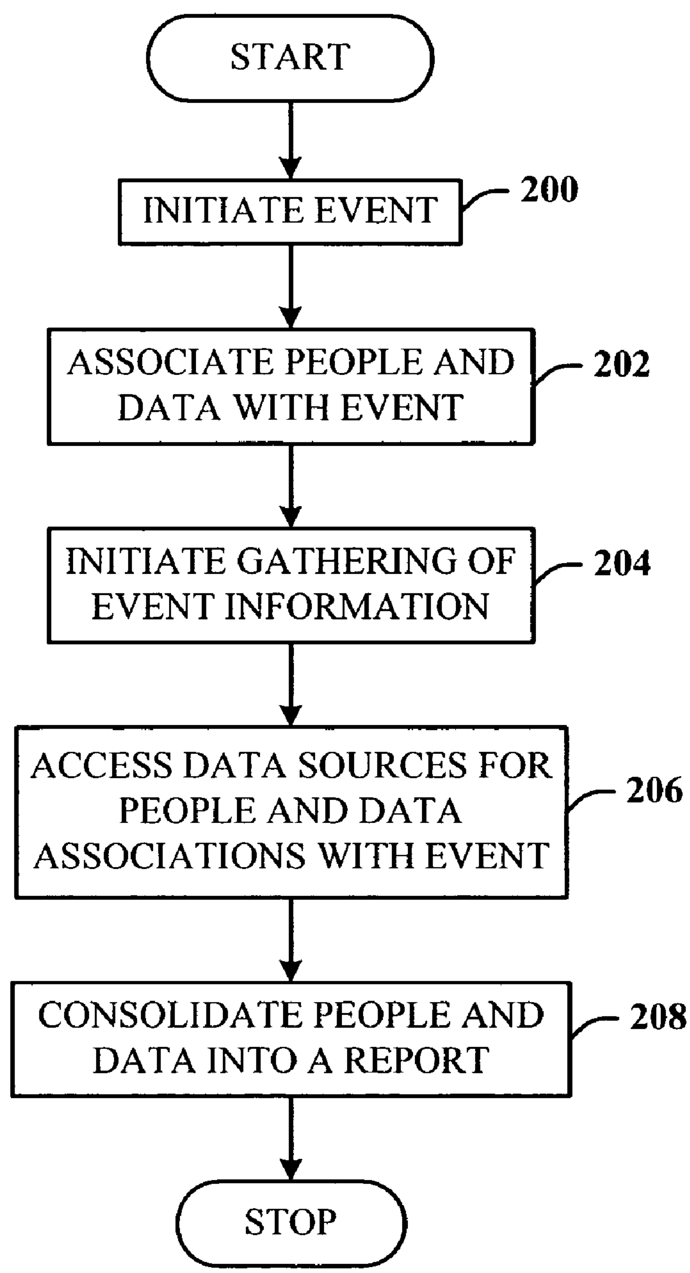
FIG. 2 illustrates a flow chart of a process for generating an even report in accordance with the present invention.

Referring now to FIG. 2, there is illustrated a flow chart of a process for generating an even report in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, an event is defined for a given time in the future. At 202, people and data are associated with the upcoming event. This includes the generation of e-mails, documents, software, assignment of personnel, generation of web sites and the posting of related information for desseminating event-related information, and storing data in data repositories, for example. It is to be appreciated that related data can also exist at other data sources and in other forms, for example, user profile information can include user images obtained from a user security data source that stores a user image for an employee badge, personal user information from human resource databases, and so on. Moreover, the data need not necessarily be generated after the event is identified. Such data can be searched and identified before the event is initiated, where simply the amount of information and/or personnel can determined that the event must occur to facilitate better management and organization.

At 204, the gathering of event information is initiated. At 206, one or more data sources are accessed to pull together all for the data previously stipulated to be part of the event report. At 208, once all data has been accessed, or while the data is being accessed, consolidation of the event information is performed to arrive at the final report document. The process then reaches a Stop block.

Figure 3:
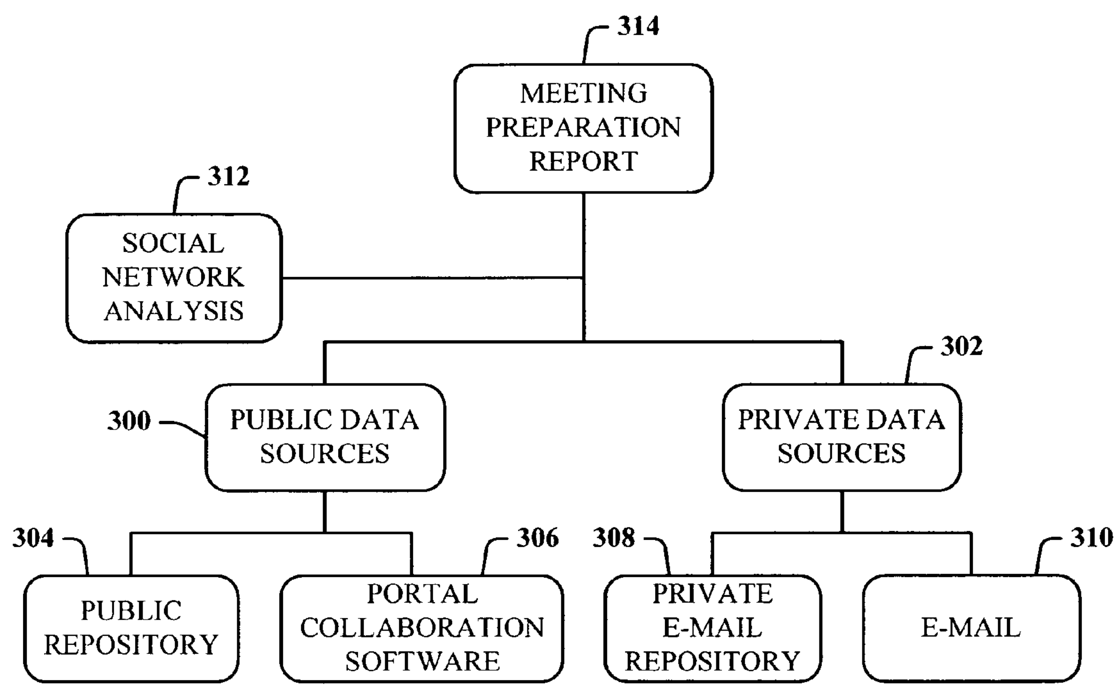
FIG. 3 illustrates a hierarchical diagram of data sources that can be access in one implementation of the present invention.

Referring now to FIG. 3, there is illustrated a hierarchical diagram of data sources that can be access in one implementation of the present invention. The principal sources of data include public data source 300 and private data sources 302. The public sources 300 can include a public data repository 304 (e.g., ACTIVE DIRECTORY-type services), and portal collaboration software 306 (e.g., SHAREPOINT-type web services). The private data sources 302 can include a private e-mail repository 308 (e.g., EXCHANGE-type services) and e-mail applications 310 (e.g., OUTLOOK-type e-mail software). Note that the data sources can include those accessible over the Internet, such as can be searched by conventional Internet search engines.

A social network analysis block 312 includes at least the consolidation component 108 of FIG. 1 such that public and private data sources (300 and 302) can be accessed and processed for consolidation, and generation of a report 314 (similar to the report 102).

Figure 4:
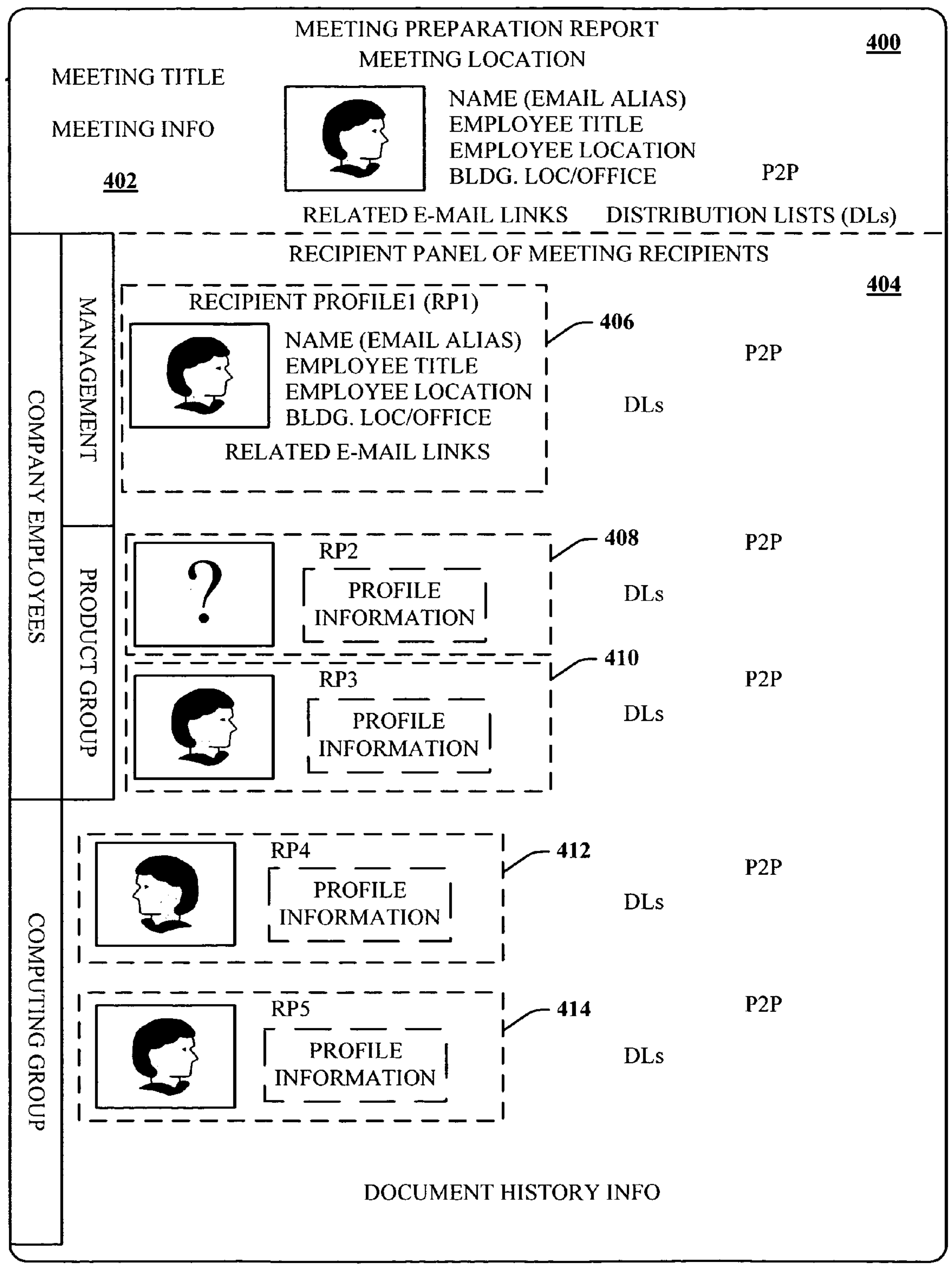
FIG. 4 illustrates a sample report of one implementation of the report generation architecture of the present invention.

Referring now to FIG. 4, there is illustrated a sample report 400 of one implementation of the report generation architecture of the present invention. A typical scenario for which the disclosed invention finds application is the following. A user discovers that they need to attend a meeting in five minutes with a selection of people from the user's group, people with whom the user has exchanged email, and people whom the user may have never met before. Having forgotten about the meeting until now, the user needs to prepare. The user can generate a one-page report 400 with the pieces of information most useful for attending the meeting. The report 400 can be a single page document (or multiple pages) as presented in a web browser that includes all or a large portion of the relevant information of an event that is to be attended by an attendee.

However, it is not required that the report be presented in a web browser format, but can be a text document, a spreadsheet document, or any other application formatted document that the user chooses to employ to output the report. It is to be appreciated that the report 400 does not include attendee information of the user that requests and prints the report, but only information of attendees other than the user wishes information. However, the present invention is not limited in this respect, wherein profile information of all attendees can be consolidated on the report 400, if desired.

In this particular implementation, the report 400 is organized according to a company organization ("org") chart whereby attendees are ranked generally from top to bottom according to the level of responsibility in the company. The report 400 indicates that seven people could be attending (six plus the user who printed the report 400). The report 400 is divided into two sections: a header section 402; and a recipient panel section 404. The disclosed architecture is suitably flexible to allow more or fewer sections according to the particular implementation.

The header section 402 is filled with general information about the meeting (which is usually found directly from an e-mail data source and is composed of the subject, time, location, and body of the meeting request). Thus, the header section 402 can include the meeting location that is parsed to extract a company building number and conference room, a meeting title, meeting information such as time, date, duration of the meeting, identification information of the user who printed the report, general knowledge (or key words) required to be productive in the meeting, and attendee profile information of who will be conducting the meeting. The keywords are automatically extracted from the meeting request. The current algorithm selects the set of words larger than three characters, and not all uppercase to use as keywords, which are then made unique and sorted alphabetically.

Such profile information can include but is not limited to an image of the attendee, the attendee name, employee title, employee work group, building, next free time (as determined by a e-mail program scheduling feature, e.g., a calendar) and office location, and telephone extension, for example. A URL (Uniform Resource Locator) shortcut can also be provided that links to the appropriate campus map and building floor map, and additional information relevant to the meeting. Additional linked information can be to e-mails that provide ready access to recent information exchanged via e-mail. Such links can also be provided to shares, attachments, and documents relevant to the meeting. The profile information can also include mailing lists (also called herein, distribution lists (DLs)) that show a connection, if any, between the user who generated the report 400 and the recipient of the meeting report.

The set of people who have received the meeting request is called the recipients. All recipients of the meeting request are displayed except for the user who initiated the generation of the meeting preparation report 400. Recipients are displayed as in the recipient panel section 404 with associated recipient profile (RP) panels of information personalized by the user. For example, a first recipient profile 406 is located in the upper left corner of the recipient section 404, and whose RP1 contains a photo (retrieved from, for example, a security data base that includes cardkey badge photos). However, if such data sources are not available, a data search can be conducted to retrieve a photo from a photo repository other from sources of the company. The first recipient profile 406 can also include the recipient name and linked, for example, to the website page for that user. An e-mail alias can also be linked to generate e-mail to that recipient when selected. The profile can also include recipient title, department, building (which can be linked to the appropriate campus map), and office (linked to the appropriate building floor map). Other profile information can be provided at the discretion of the user, or reduced accordingly.

E-mail links from the recipient and relevant to the meeting request can be displayed in the profile panel 406. An e-mail search can be conducted according to date or duration, for example, for emails from that recipient received within the last six months. This approach can also be provided to search the user's email for keywords relevant to the meeting.

The recipient panel section 404 also includes the profiles of other recipients, for example, a second recipient profile (RP2) for a second recipient 408, a third recipient profile (RP3) for a third recipient 410, a fourth recipient profile (RP4) for a fourth recipient 412, and a fifth recipient profile (RP5) for a fifth recipient 414. Each profile also includes the DLs for each recipient.

DLs are selected to show any connections between the user and the recipient of the meeting request. In one implementation, starting from DLs with a size smaller than fifty, a search is made we to look for distribution lists that are shared between the user and the recipient. If fewer than three of these shared distribution lists are found, then the list is supplemented with the unshared distribution lists of that recipient to bring the total to three.

Point-to-point (P2P) connections are also searched and are presented. A P2P connection is defined as follows. Each person has a set of people with whom they are connected through distribution lists (this set is all of the people on all of the distribution lists of which the person is a member). The set of potential P2P connections is the intersection of the set of people connected to the user and the set of people connected to the recipient. The P2P connection person is the person within the set of potential P2P connections closest to the top of the org chart.

The meeting organizer recipient is emphasized by placement in the header of the report. The other recipients compose the recipient panel section of the report following the header. The other recipients are sorted by decreasing org chart distance from the user. The org chart distance between two people is defined to be the shortest path within the org chart. Intuitively, this can be found between two people by summing each person's org chart distance to the manager shared by both people. This sort order places more familiar recipients (i.e., those likely to be on the same team as the user) on the bottom and more unfamiliar recipients (those likely to be from other teams) on the top. Thus, the report 400 can be formatted to present a top-down sorting of the recipients, where the first recipient 406 is associated with management, as indicated by a MANAGEMENT sidebar, and the second and third recipients (408 and 410) are associated with a lower grouping on the org chart (e.g., a PRODUCT GROUP sidebar). The fourth and fifth recipients (412 and 414) are lower in the management hierarchy, and thus, lowest on the report page, and associated with a lower grouping (e.g., a COMPUTER GROUP sidebar).

It is to be appreciated that the order of presenting attendees on the report can be according to any rule imposed for a given meeting. If the meeting or event is to deal strictly with organizational planning or the like, the report can be generated according to the org chart. If the event is related to a round-table discussion where a teamwork concept is to be emphasized, the report can be formatted such that recipient profiles are sized to accommodate placement in a circle on the report. This removes the hierarchy format that is not necessary for a "teamwork" meeting.

Figure 5:
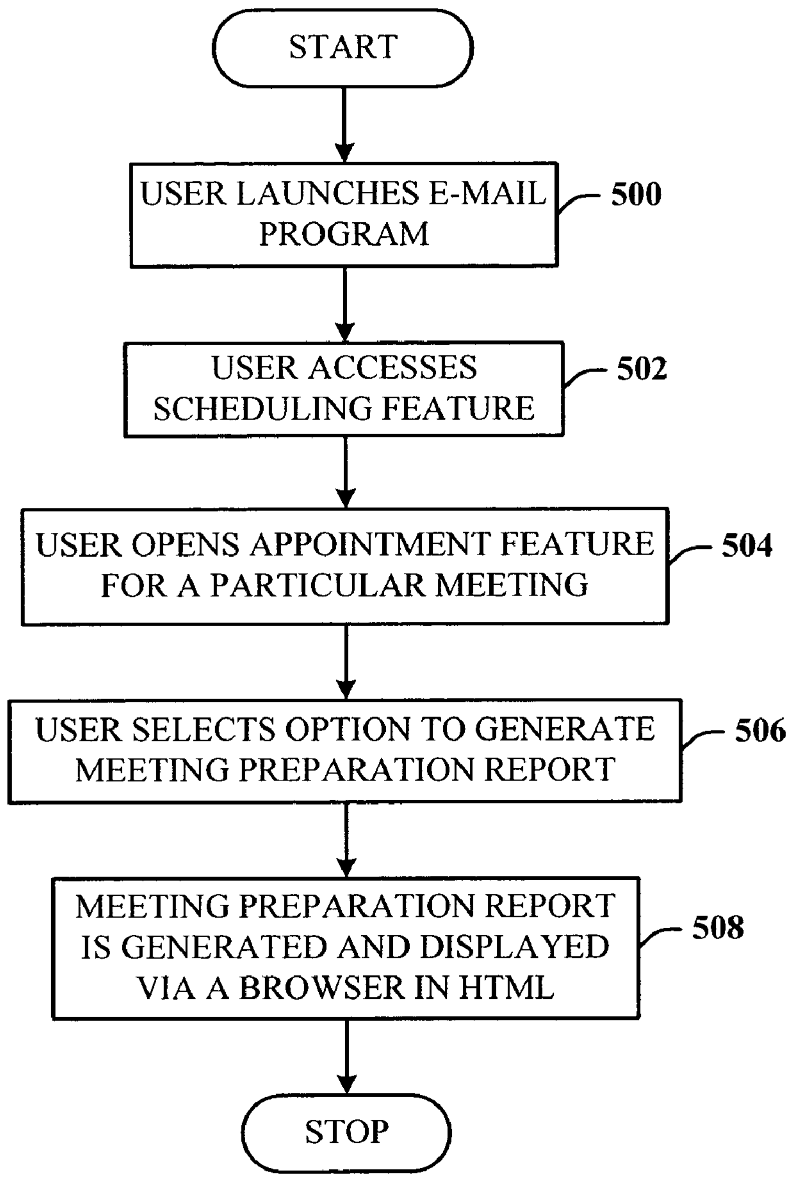
FIG. 5 illustrates a flow chart of one process for initiating generation of the report via an e-mail application in accordance with the present invention.

Referring now to FIG. 5, there is illustrated a flow chart of one process for initiating generation of the report via an e-mail application in accordance with the present invention. In one implementation, the report preparation architecture can be centered on an e-mail application, since in many conventional e-mail applications, appointment and scheduling features are bundled in such programs. At 500, the user launches an e-mail program to gain access to the provided appointment and scheduling features. At 502, the user accesses a scheduling feature. At 504, the user opens an appointment feature related to a particular event, such as a meeting. At 506, the user selects an option to generate the meeting preparation report. At 508, the system processes the request, pulls together all of the relevant event information, formats the information according to a predetermined document format, and presents the report via a browser in HTML (HyperText Markup Language) or some other web based SGML (Standard Generalized Markup Language) derivative, e.g., XML, and XHTML to the user. Note, however, that the report need not be in the format for presentation by a web browser, as indicated hereinabove, but can be in any format desired by the user. The process then reaches a Stop block.

Figure 6:
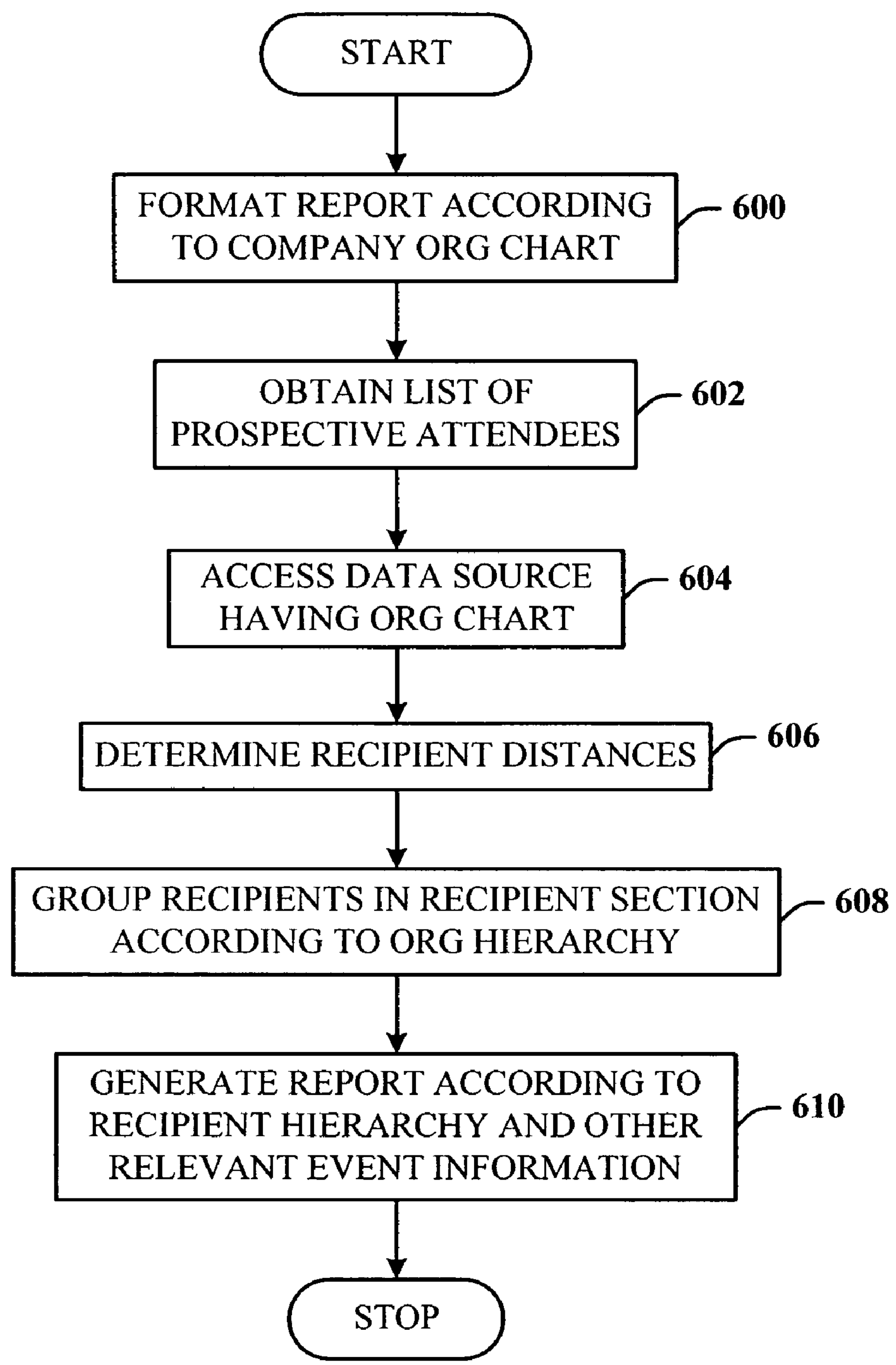
FIG. 6 illustrates a flow chart of a sorting algorithm based on a company org chart for sorting and presenting recipients on the report, in accordance with the present invention.

Referring now to FIG. 6, there is illustrated a flow chart of a sorting algorithm based on a company org chart for sorting and presenting recipients on the report, in accordance with the present invention. At 600, the system determines that the report is to be sorted and formatted according to the company org chart. At 602, the system obtains a list of prospective attendees. In one implementation, this list can be generated from an event "acceptance" reply or tag that the attendee selected at some previous point in time. At 604, the system accesses a data source where the org chart information resides. At 606, the system determines the recipient distances based on the hierarchy of the org chart. At 608, all recipients are group in the recipients panel section of the report according to the org chart hierarchy. These sorted recipients can be grouped according to the DLs, titles, and departments. In another implementation, this can include e-mails. "Groups" can be defined to include, for example, the recipient title, department, and set of DLs to which the recipient belongs. Starting from the top of the sorted recipients, the sorting algorithm finds the set of groups that contain the most recipients (adjacent on the page). This search is repeated recursively to find subgroups. At 610, the report is generated according to recipient hierarchy and other relevant event information. The process then reaches a Stop block.

Figure 7:
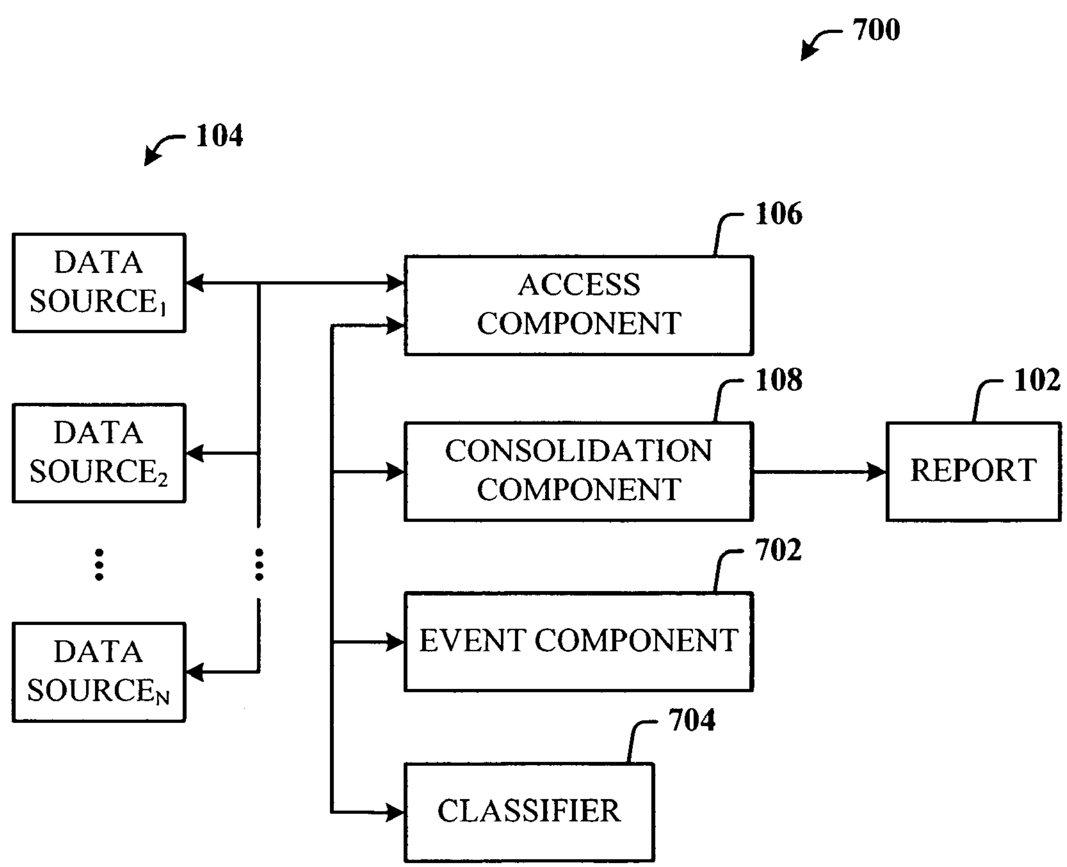
FIG. 7 illustrates one implementation of a system that employs artificial intelligence in accordance with the present invention.

Referring now to FIG. 7, there is illustrated one implementation of a system 700 that employs artificial intelligence in accordance with the present invention. In addition to the access component 106, consolidation component 108, the system 700 further includes an event component 702 that can include event information (e.g., appointment information and scheduling information), and further includes the capability to detect a trigger, and facilitate when an event report is to be generated around a particular event or meeting based on the event information. The event component 702 can also be configured to automatically generate the report based on time, which time is a trigger. The time can be minutes before the event, hours before, etc. The trigger can also occur based on a change to a report that was previously generated and stored for processing by the event component to detect the change.

The subject invention (e.g., in connection with selection and sorting) can employ various artificial intelligence based schemes for carrying out various aspects of the subject invention. For example, a process for determining how to sort or format recipient information on the report can be facilitated via a classifier component 704 that automates those processes. The classifier 704 can facilitate social network analysis in accordance with the present invention. For example, a learning machine algorithm (a classifier, in particular) can be used to select the middle person for the point-to-point connection.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria how to sort the recipient information, how to present the recipient information on the report, formatting the report based on the attendees who confirmed attendance at the event, when to extend a single-page report to more than one page based on a number of criteria (e.g., the importance of the event, the importance of the information to be discussed at the event, the importance of the attendees, and the distance of an attendee from the top of a company org chart), when to include certain attendee information (e.g., a picture, e-mail links, and DLs), to sort and/or format the report based on user preferences such that the report is customized for the user, fixing the report format based on a number of criteria that indicate the event will be more productive when the report is in a certain format, and adjusting the format of the report based on the device or equipment on which it will be presented (e.g., small portable handheld device and PC tablet).

The classifier 704 can also be used to improve the relevancy of selected content such as e-mails and documents by tailoring the selection to the content of the meeting agenda and composition of the meeting attendees, as well as provide a mechanism for introducing a shared group space for the meeting. Thus, this shared space can be used by a group or anyone for collaborative work, for example. An individual can edit any document on the shared space. The shared space is a central meeting place that can be accessed before, during, and after meeting to update action items.

The classifier 704 can also be employed to introduce color schemes in any manner that can emphasize certain important aspects of the meeting. Other formatting can also be used, for example, different fonts, and font sizes, images, video, and audio files and links thereto, for example.

Where the event is restricted to certain level of attendees, the classifier can be employed to determine the lowest level of data access allowed or any attendee, and limit access to the various disparate data sources according to the lowest access level. Where the event information is of the utmost importance, the level of access can be elevated to access information at a higher level such that the attendees can be more productive by having access to the more important information.

As can be seen, the flexibility that can be employed when utilizing a classifier is greatly enhanced, limited only by the control imposed on the classifier to adhere to certain rules or criteria according to a given event or situation.

Figure 8:
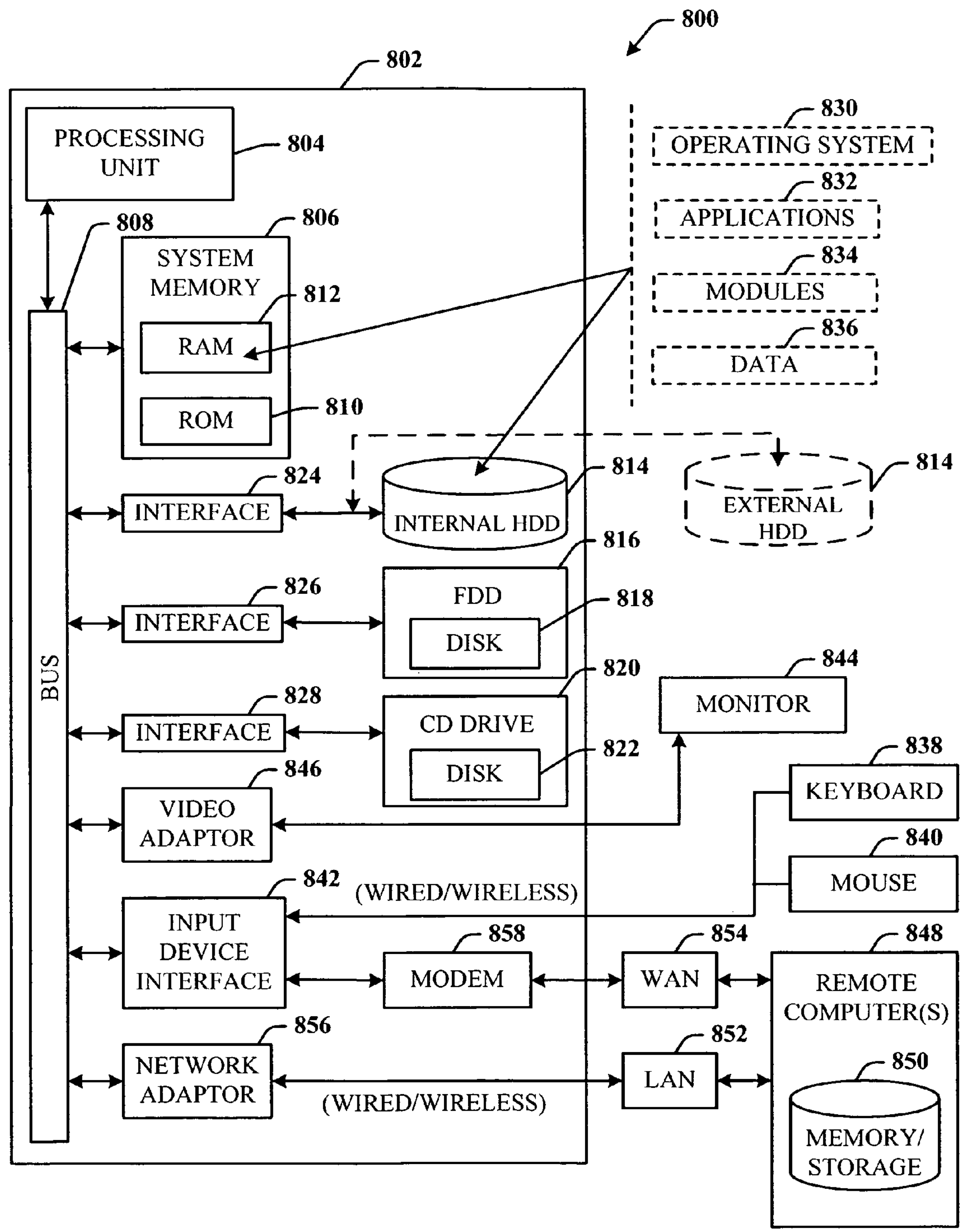
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 812, including an operating system 830, one or more application programs 832, other program modules 834 and program data 836. All or portions of the operating system, applications, modules, and/or data can also be cached in the RAM 812.

It is appreciated that the present invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 can include a modem 858, or is connected to a communications server on the LAN, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 9:
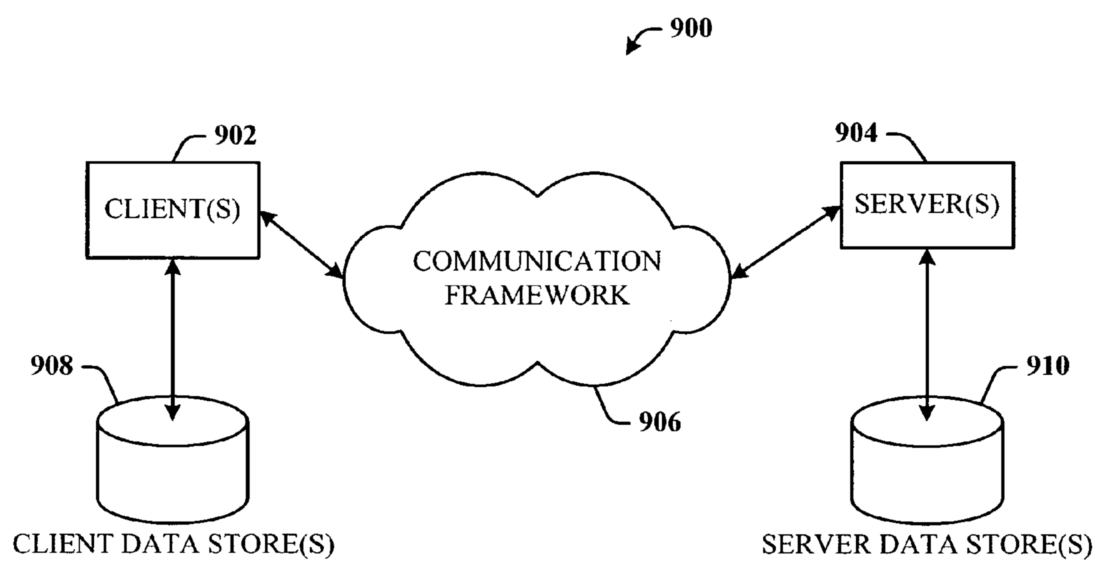
FIG. 9 illustrates a schematic block diagram of an exemplary computing environment in accordance with the present invention.

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates the generation of an event document for a user, comprising a processor and a computer memory having stored thereon the following components:

an access component that accesses a plurality of disparate data sources for event information related to an event; and a consolidation component that consolidates the event information to generate an event document customized to a user within an organizational chart, the event document presents the event information such that prospective attendee profiles are arranged in a decreasing order of their respective organizational chart distance from the user wherein the organizational chart distance is a shortest path between the user and a prospective attendee within the organizational chart obtained by summing the user's and the prospective attendee's organizational chart distance to a manager shared by the user and the prospective attendee.

2. The system of claim 1, the data sources are at least one of public and private.

3. The system of claim 1, the event document is a meeting preparation report.

4. The system of claim 1, the data sources include at least one of e-mail, a shared data source, a user profile, a document relevant to the event, and an e-mail attachment.

5. The system of claim 1, the event information includes an image of a user scheduled to attend the event.

6. The system of claim 1, the event document is a single page document.

7. The system of claim 3, the report is formatted to present the event information in a predetermined way.

8. The system of claim 1, the event document is presented to the user via a browser.

9. The system of claim 1, the event document is generated through an e-mail application and further comprises links to one or more emails relevant to the event retrieved through an email search conducted on one or more of a date of the event or keywords relevant to the event.

10. A computer that employs the system of claim 1.

11. The system of claim 1, further comprising a classifier that automates a feature by making an inference based on one or more data associated with the event.

12. A system that facilitates the generation of an event document, comprising a processor and a computer memory having stored thereon the following components:

an access component that accesses at least one of a public data source and a private data source for event information related to an event;

an event component that detects a trigger; and a consolidation component that compiles and consolidates the event information into a meeting document based on the occurrence of a trigger associated with a user within an organizational chart, wherein profiles for the event attendees are arranged in descending order of their respective organizational chart distance to the user, wherein the organizational chart distance between the user and a second person is a shortest path within the organizational chart, obtained by summing the user's and the second person's organizational chart distance to a manager shared by the user and the second person.

13. The system of claim 12, the meeting document is prepared for the event.

14. The system of claim 12, the trigger is a manual option selected to cause generation of the meeting report.

15. The system of claim 12, the public and private data sources include data related to at least one of e-mail, a shared public data source, a user profile, a user image, a document relevant to the event, and an e-mail attachment.

16. The system of claim 12, the meeting document is presented to the user via a browser in HTML.

17. The system of claim 12, the meeting document is generated in a personalized format for a given user.

18. The system of claim 12, a portion of the event information is derived by searching the contents of at least one of e-mail and a document associated with a meeting attendee.

19. The system of claim 12, the event information includes at least one of a link to an e-mail related to the event, a distribution list, and a point-to-point connection.

20. A computer-readable storage medium having computer-executable instructions for performing a method of generating a meeting preparation document, comprising:

receiving a request to generate the meeting preparation document;

accessing at least one of a public data source and a private data source to retrieve relevant meeting information;

arranging the relevant meeting information into a personalized format for a user present in an organizational chart wherein profiles of attendees are arranged according to their respective decreasing organizational chart distance relative to the user wherein the organizational chart distance is a shortest path between the user and an attendee within the organizational chart, wherein the organizational chart distance is a sum of the attendee's and the user's organizational chart distance to a manager common to the user and the attendee; and generating the meeting preparation document according to the personalized format.

21. The medium of claim 20, the public and private data sources include at least one of e-mail, an image, a shared data source, a user profile, a document relevant to the event, and an e-mail attachment.

22. The medium of claim 20, further comprising limiting the meeting preparation document to a single page document.

23. The medium of claim 20, further comprising presenting the meeting preparation document via a browser in an SGML format.

24. The medium of claim 20, further comprising activating generation of the meeting preparation document through an e-mail application.

25. The medium of claim 20, further comprising generating the meeting preparation document in response to a trigger.

26. The medium of claim 20, the trigger occurs in association with at least one of a manual selection initiated by the user, a time, and a change detected in the meeting preparation document.

27. The medium of claim 20, further comprising limiting the meeting information that is presented to attendees other than the user.

28. A system that facilitates the generation of a meeting preparation document, comprising a processor and a computer memory having stored thereon the following components:

means for receiving a request to generate the meeting preparation document from a user associated with an organizational chart;

means for accessing at least one of a public data source and a private data source to retrieve relevant meeting information;

means for arranging the relevant meeting information further comprising at least a plurality of prospective attendee profiles into a personalized format for the user wherein the attendee profiles for the meeting are arranged according to their decreasing organizational chart distance relative to the user wherein the organizational chart distance is a shortest path between the user and a meeting attendee within the organizational chart obtained by summing the user's organizational chart distance to a manager shared by the user and the meeting attendee;

means for generating the meeting preparation document according to the personalized format.

29. The system of claim 28, the means for accessing includes accessing means that accesses at least one of e-mail, an image, a shared data source, a user profile, a document relevant to the event, and an e-mail attachment.

30. The system of claim 28, further comprising means for limiting the meeting preparation document to a single page document.

31. The system of claim 28, further comprising means for presenting the meeting preparation document via a browser in an SGML format.

32. The system of claim 28, further comprising means for activating generation of the meeting preparation document through an e-mail application.

33. The system of claim 28, further comprising means for automatically generating the meeting preparation document in response to a trigger.

* * * * *